Oct. 27, 1959  T. W. SPAETGENS  2,909,911
HELICAL SPRING FLEXIBLE COUPLING
Filed June 17, 1957  2 Sheets-Sheet 1
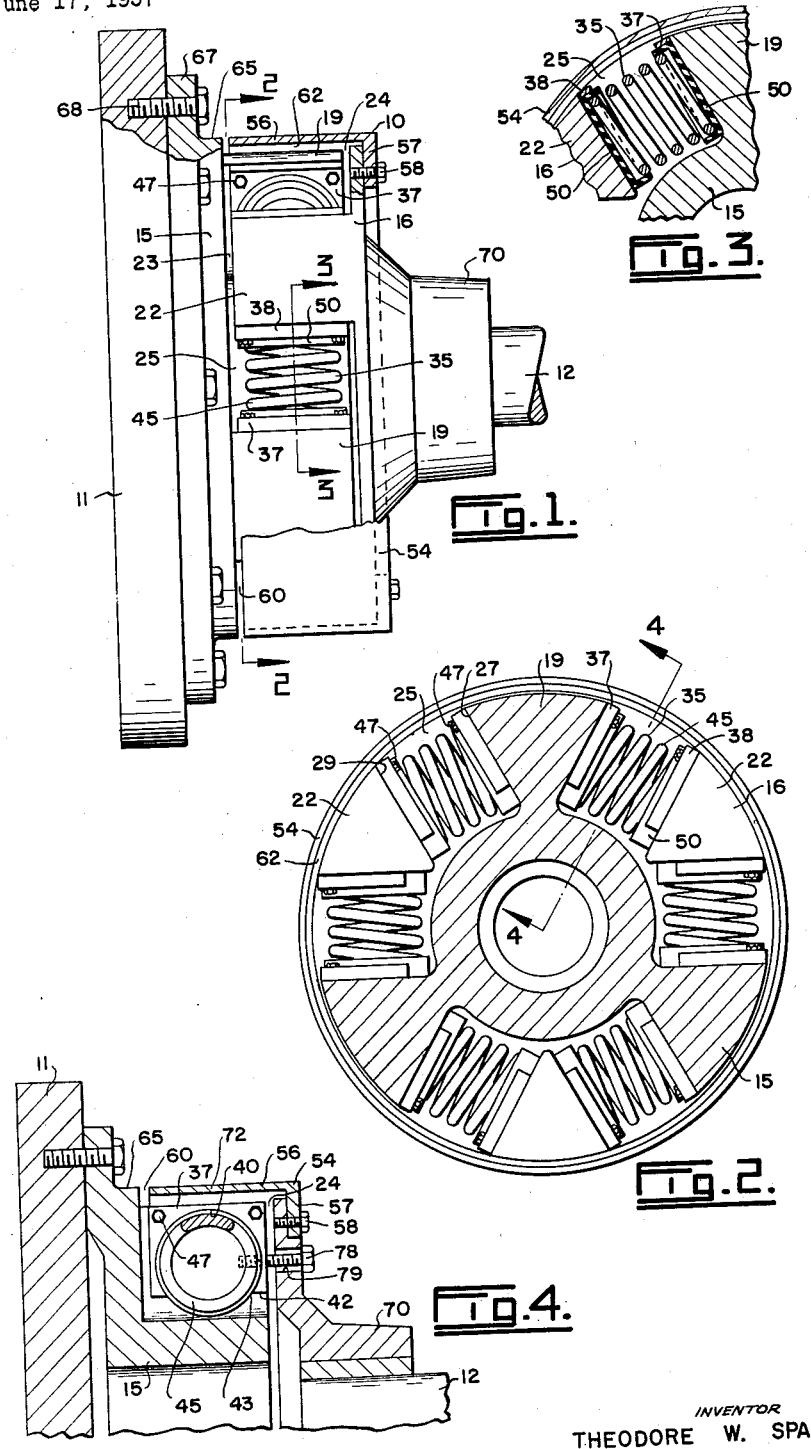
INVENTOR
THEODORE W. SPAETGENS
BY
Fetherstonhaugh & Co.
ATTORNEYS Oct. 27, 1959 T. W. SPAETGENS 2,909,911
HELICAL SPRING FLEXIBLE COUPLING
Filed June 17, 1957 2 Sheets-Sheet 2
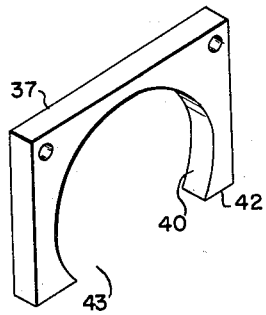
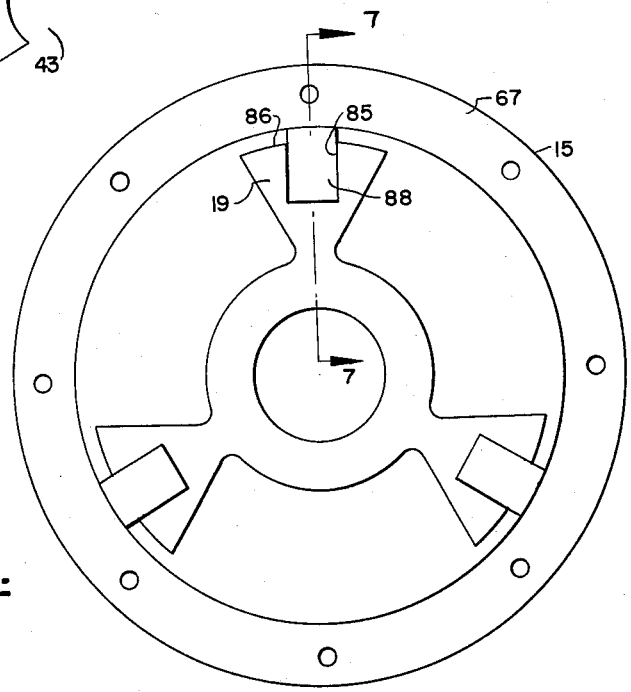
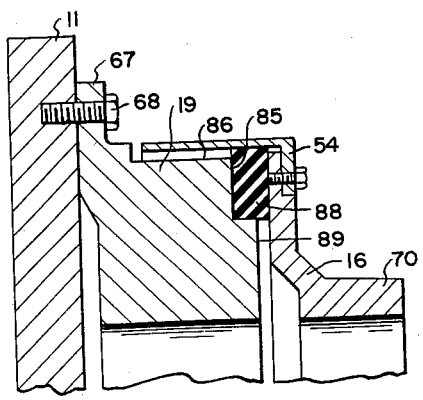
INVENTOR
THEODORE W. SPAETGENS
BY
Fetherstonhaugh & Co.
ATTORNEYS

United States Patent Office 2,909,911
Patented Oct. 27, 1959

2,909,911

HELICAL SPRING FLEXIBLE COUPLING

Theodore W. Spaetgens, South Burnaby, British Columbia, Canada

Application June 17, 1957, Serial No. 666,145

11 Claims. (Cl. 64—14)

This invention relates to flexible couplings employing helical compression springs as a resilient connection between two coupling elements.

Couplings of this nature are used between driving and driven units. These units may be shafts and/or machines. For the sake of convenience, the coupling is described herein in connection with a diesel engine as the driving unit, and an electrical generator as the driven unit. However, it is to be understood that this coupling may be used in any place where flexible couplings are needed.

The helical coil springs of this coupling and the resulting high degree of torsional flexibility permit a very low tuning of the torsional vibrational criticals affecting the driving and driven machines as a unit. Normally, with most flexible couplings employing rubber, grid springs, fabric, etc. the torsional stiffness of the coupling is great enough (or the flexibility is low enough) to induce one or more serious torsional vibration criticals in the operating speed range. This is particularly so when the prior couplings are used between an engine and a generator. The addition of the generator inertia to the engine through a relatively stiff coupling affects the torsional vibration characteristics of the engine to such an extent that a complete recalculation of the engine-generator system is required. In other words, even though the engine alone has good torsional vibration characteristics, connecting it to a generator through a stiff coupling may result in these characteristics becoming dangerous. This applies to the connecting together of many different types of machines, such as, engine-generators, engine-compressors, engine-propellors, engine-reduction gears, and the like.

A flexible coupling employing helical springs can overcome these difficulties and in addition provide immunity, when properly applied, for the driven machine against engine-existed torsional vibration. Furthermore, a coupling of this type, because of the high flexibility of helical springs in all directions, amply provides for both angular and parallel misalignment of shafts.

The idea of using helical springs in flexible couplings is not new. However, such couplings, in spite of their very good and useful characteristics, are not in wide use. The reason for this lies partly in the difficulty in installing the springs and retaining them in place in the coupling.

The main object of the present invention is the provision of a flexible coupling having a helical compression spring assembly which may be quickly and conveniently inserted in position and removed from the coupling and yet remain under compression for even the maximum travel of the coupling elements.

A coupling according to the present invention comprises a pair of spaced substantially parallel coupling members, lugs projecting from each member between and spaced from the lugs of the other member and spaced from the latter member, the lugs of one member being opposed to those of the other member and forming gaps therebetween, a spring assembly in each gap between the lugs; each spring assembly comprising a pair of spaced retaining plates having spring seats thereon facing each other, and a helical spring extending between the plates with its ends on the seats thereof, and means securing the plates of the assembly in each gap to the opposed lugs forming said gap.

An example of this invention is illustrated in the accompanying drawings, in which, Figure 1 is a side elevation, partly in section, of the coupling, one part of which is connected to the flywheel of an engine, and the other part is connected to a shaft of a driven machine, Figure 2 is a vertical section taken on the line 2—2 of Figure 1, Figure 3 is a fragmentary section taken on the line 3—3 of Figure 1, Figure 4 is a vertical section through a portion of the coupling, the position of the section being indicated by line 4—4 of Figure 2, this view serving to illustrate how the various elements are positioned and aligned during assembly of the coupling, Figure 5 is an enlarged perspective view of a retaining plate by itself, Figure 6 is an elevation of one of the coupling members of the coupling with its lugs, illustrating an alternative form of the invention, the other coupling member and the spring assemblies having been removed, and Figure 7 is a fragmentary sectional view through the assembled alternative form of coupling, said section being indicated by line 7—7 of Figure 6.

Referring to the drawings, 10 is a coupling for connecting a driving unit to a driven unit. In this example, one side of the coupling is connected to the flywheel 11 of an engine, not shown, while the other side of the coupling is connected to a driven shaft 12 of a machine, such as an electrical generator.

The coupling 10 includes spaced substantially parallel coupling members or plates 15 and 16. The member 15 has a plurality of spaced lugs 19 projecting outwardly therefrom towards member 16, and the latter has a plurality of lugs 22 projecting outwardly therefrom towards the first member. The lugs of one member extend between the lugs of the other and are spaced therefrom. The outer ends of lugs 19 are spaced from member 16 as indicated at 24, and the outer ends of lugs 22 are spaced from member 15 as indicated at 23. These interfitting lugs form gaps 25 therebetween. Although the lugs may have any desired cross sectional shape, it is preferable to form lugs 19 with flat side faces 27 which are similar and substantially parallel to flat faces 29 on lugs 22, see Figure 2.

There is a spring assembly 35 between each lug 19 and an adjacent lug 22 in the gap 25 formed therebetween. As the spring assemblies are identical, one only will now be described in detail.

Each spring assembly 35 includes a pair of spaced retaining plates 37 and 38. Each plate has a spring seat thereon, and in this example, it is formed with a recess 40 for this purpose. The recess of each plate may extend only part way into the plate, or as shown, it may extend completely through the plate, in which case, the lug face one which the plate is mounted forms the bottom of the recess. Furthermore, each recess 40 may be completely within the plate, or it may open out from the lower edge 42 thereof, as indicated at 43 in Figures 4 and 5. The assembly 35 also includes a helical spring 45, the opposite ends of which fit in the recesses 40 of retaining plates 37 and 38.

Each spring 45 and its retaining plates 37 and 38 are assembled before being inserted in a gap 25 in the coupling. The spring needs to be compressed sufficiently to enable its ends and the retaining plates to be slipped in between the faces 27 and 28 of adjacent lugs. It is preferable to have the springs in the coupling so compressed that when the lugs are in their extreme positions, at which time every second spring is compressed solid, the remaining springs are still under compression. The retaining plates are held in position in any desired manner, such as by means of cap screws 47, which extend through the plates near the outer edges thereof and are threaded into the lugs against which the retaining plates bear.

Although each spring 45 may be mounted directly in its retaining plates 37 and 38, it is helpful to provide a cap 50 on each end of the spring, see Figure 3. Each cap is formed of a resilient and electrical insulating material, such as rubber, plastic or the like, and it is so formed that it segregates the spring from the adjacent retaining plate and the lug face. As the coupling members 15 and 16 and their respective lugs are completely separated from each other, and the springs 45 form the only connection between the two parts of the coupling, these caps serve as an electrical insulation between the two coupling members, and they minimize the transfer of electrical currents and noise through the coupling.

When the coupling has been assembled, an annular cover 54 is placed over the lugs and spring assemblies associated therewith. This cover is in the form of an annular wall 56 having a flange 57 projecting inwardly from one edge thereof. This flange is removably connected to one of the coupling members 15 or 16, and in this example, it overlaps member 16 and is secured thereto by a plurality of bolts 58. In other words, the cover is secured to member 16 and projects therefrom towards but terminates short of the member 15 so that there is a gap 60 between said cover and the latter member, see Figure 1. The cover is spaced outwardly from the lugs 19 and 22 leaving a clearance 62 therebetween.

In this example, the coupling member 15 is formed with an annular shoulder 65, the surface of which is concentric and parallel with the axis of the coupling. Furthermore, this member is provided with an outwardly-extending flange 67 which is bolted to the flywheel 11 by bolts 68.

Coupling member 16 is provided on its outer surface centrally thereof with an outwardly-extending hub 70 into which shaft 12 is secured. Therefore, the rotation of the driving element or flywheel 11 is transferred to the shaft 12 through coupling 10.

By referring to Figures 1 and 4, it will be seen that the outer surface 72 of cover 54 is aligned with the outer surface of shoulder 65 of the coupling member 15. When the cover is secured in place, its outer surface extends parallel to and is concentric with the coupling axis. Therefore, when the surface of shoulder 65 and the outer surface 72 of the cover are exactly aligned, the coupling members are true to each other and are normal to the coupling axis. This ensures parallel alignment of the shafts or other members which are connected together by the coupling. Angular alignment is assured by keeping gap 60 equal all the way around the coupling.

As an aid to getting the initial line-up on two connected machines, the coupling halves can be temporarily locked together in perfect alignment to form a "solid" coupling, by inserting equal spacer pieces or plates in the gap 60 at several points around the periphery, and drawing the coupling halves together by a plurality of bolts 78 which extend freely through holes 79 in member 16 and are threaded into lugs 19, see Figure 4. The holes 79 may also be used for anchoring points when torqueing the coupling halves for insertion of spring assemblies (when spreader tool is not available).

Figures 6 and 7 illustrate a slight variation in coupling 10. In the outer or free ends of lugs 19 or 22, and preferably lugs 19, as shown, are radiating slots 85 which preferably open outwardly from the surfaces 86 of the lugs, as shown in Figure 6. An insert 88 formed of rubber, brake lining material, or other friction-type material is placed in each recess 85 and projects outwardly from the outer end 89 of the lug. This insert frictionally bears against the bearing member 16. These inserts may be removably secured in their respective recesses in any desired manner. However, they may just frictionally fit in the recesses, in which case the annular cover 54 prevents them from coming out therefrom.

The inserts 88 project outwardly from the outer ends of the lugs of one coupling member and frictionally engage the other coupling member. When the coupling is functioning normally, there is no relative movement between the members thereof. However, when the coupling is going through its resonant zone, usually during starting and stopping, the vibratory oscillations of the coupling elements are momentarily amplified. These inserts provide a snubbing action which dampens the relative movement between the coupling elements at this time. In order to replace these inserts, it is only necessary to remove the annular cover, extract the old inserts from their recesses, and replace them with new inserts.

What I claim as my invention is:

1. A flexible coupling comprising a pair of spaced substantially parallel coupling members, lugs projecting from each member between and spaced from the lugs of the other member and spaced from the latter member, the lugs of one member having faces on opposite sides thereof spaced from and opposed to corresponding faces of the lugs of the other member and forming gaps therebetween, a spring assembly removably mounted as a unit in each gap between the lugs so that there is an assembly extending between both faces of each lug and the opposed faces of the next adjacent lugs; each spring assembly comprising a pair of spaced retaining plates having spring seats thereon facing each other, and a helical spring extending between the plates with its ends on the seats thereof; and means outside the spring removably securing the plates of the assembly in each gap to the faces of the opposed lugs forming said gap, said plates of each assembly being shaped to move with the spring therebetween over the lugs into and out of the lug gap when not secured to the lugs.

2. A flexible coupling as claimed in claim 1 in which the spring seat in each removable assembly plate is a recess into which the spring end fits.

3. A flexible coupling as claimed in claim 1 in which the spring seat in each assembly plate is a recess into which the spring end fits, and each plate recess opens out from the edge of its plate that extends inwardly of the coupling, said recess being large enough to receive most of the spring end with a little of said end projecting inwardly from said plate.

4. A flexible coupling comprising a pair of spaced substantially parallel coupling members, lugs projecting from each member between and spaced from the lugs of the other member and spaced from the latter member, the lugs of one member having faces on opposite sides thereof spaced from and opposed to corresponding faces of the lugs of the other member and forming gaps therebetween, a spring assembly removably mounted as a unit in each gap between the lugs so that there is an assembly extending between both faces of each lug and the opposed faces of the next adjacent lugs; each spring assembly comprising a pair of spaced retaining plates having spring seats thereon facing each other, and a helical spring extending between the plates with its ends on the seats thereof; and means outside the spring removably securing the plates of the assembly in each gap to the faces of the opposed lugs forming said gap, each spring being compressed a little when the spring in the next gap circumferentially is compressed substantially to solid, said plates of each assembly being shaped to move with the spring therebetween over the lugs into and out of the lug gap when not secured to the lugs.

5. A flexible coupling comprising a pair of spaced substantially parallel coupling members, lugs projecting from each member between and spaced from the lugs of the other member and spaced from the latter member, the lugs of one member having faces opposed to and substantially parallel with similar faces of the lugs of the other member and forming gaps therebetween, a spring assembly removably mounted as a unit in each gap between the lugs so that there is an assembly extending between both faces of each lug and the opposed faces of the next adjacent lugs; each spring assembly comprising a pair of spaced flat retaining plates having spring seats thereon facing each other, and a helical spring extending between the plates with its ends on the seats thereof; and means removably securing the plates of the assembly in each gap to the opposed faces of the lugs forming said gap, said plates of each assembly being shaped to move with the spring therebetween over the lugs into and out of the lug gap when not secured to the lugs.

6. A flexible coupling comprising a pair of spaced substantially parallel coupling members, lugs projecting from each member between and spaced from the lugs of the other member and spaced from the latter member, the lugs of one member having faces opposed to and substantially parallel with similar faces of the lugs of the other member and forming gaps therebetween, a spring assembly in each gap between the lugs; each spring assembly comprising a pair of spaced flat retaining plates having spring seats thereon facing each other, a helical spring extending between the plates with its ends on the seats thereof, a cap on each end of each spring between said end and the adjacent plate, each cap being formed of sound and electrical insulating material; and means securing the plates of the assembly in each gap to the opposed lugs forming said gap.

7. A flexible coupling comprising a pair of spaced substantially parallel coupling members, lugs projecting from each member between and spaced from the lugs of the other member and spaced from the latter member, the lugs of one member being opposed to those of the other member and forming gaps therebetween, inserts in and projecting from the outer ends of the lugs of one coupling member frictionally engaging the adjacent surface of the other coupling member, said inserts being formed of friction-resisting yieldable material, a spring assembly in each gap between the lugs; each spring assembly comprising a pair of spaced retaining plates having spring seats thereon facing each other, and a helical spring extending between the plates with its ends on the seats thereof; and means securing the plates of the assembly in each gap to the opposed lugs forming said gap.

8. A flexible coupling comprising a pair of spaced substantially parallel coupling members, lugs projecting from each member between and spaced from the lugs of the other member and spaced from the latter member, the lugs of one member being opposed to those of the other member and forming gaps therebetween, a shoulder formed on one coupling member outwardly of its lugs extending parallel and concentric with the coupling axis, an annular cover connected to the other coupling member and parallel and concentric with said axis, said cover overlapping the interfitting lugs and being spaced outwardly therefrom and being aligned with the shoulder of the first-mentioned member, a spring assembly in each gap between the lugs; each spring assembly comprising a pair of spaced retaining plates having spring seats thereon facing each other, and a helical spring extending between the plates with its ends on the seats thereof; and means securing the plates of the assembly in each gap to the opposed lugs forming said gap.

9. A flexible coupling comprising a pair of spaced substantially parallel coupling members, lugs projecting from each member between and spaced from the lugs of the other member and spaced from the latter member, the lugs of one member being opposed to those of the other member and forming gaps therebetween, a shoulder formed on one coupling member outwardly of its lugs extending parallel and concentric with the coupling axis, an annular cover connected to the other coupling member and parallel and concentric with said axis, said cover overlapping the interfitting lugs and being spaced outwardly therefrom and being aligned with the shoulder of the first-mentioned member, a spring assembly in each gap between the lugs; each spring assembly comprising a pair of spaced retaining plates having spring seats thereon facing each other, and a helical spring extending between the plates with its ends on the seats thereof; means outside the spring removably securing the plates of the assembly in each gap to the opposed lugs forming said gap, spacer means inserted between the annular cover and the shoulder evenly to space them apart, and means removably connecting the coupling members together temporarily to form a solid coupling.

10. A flexible coupling comprising a pair of spaced substantially parallel coupling members, lugs projecting from each member between and spaced from the lugs of the other member and spaced from the latter member, the lugs of one member being opposed to those of the other member and forming gap therebetween, a spring assembly removably mounted as a unit in each gap between the lugs; each spring assembly comprising a pair of spaced retaining plates having spring seats thereon facing each other, and a helical spring extending between the plates with its ends on the seats thereof; means outside the spring removably securing the plates of the assembly in each gap to the opposed lugs forming said gap, said plates of each assembly being shaped to move with the spring therebetween over the lugs into and out of the lug gap when not secured to the lugs, and means removably connecting the coupling members together temporarily to form a solid coupling.

11. A flexible coupling comprising a pair of spaced substantially parallel coupling members, lugs projecting from each member between and spaced from the lugs of the other member and spaced from the latter member, the lugs of one member having faces opposed to and substantially parallel with similar faces of the lugs of the other member and forming gaps therebetween, a spring assembly in each gap between the lugs; each spring assembly comprising a pair of spaced flat retaining plates with openings therethrough forming spring seats therein which face each other, and a helical spring having opposed ends bearing against the lug faces within the plate openings; and means removably securing the plates of the assembly in each gap to the opposed faces of the lugs forming said gap, said plates of each assembly being shaped to move with the spring therebetween over the lugs into and out of the lug gap when not secured to the lugs.

References Cited in the file of this patent

UNITED STATES PATENTS

| | | |
|---|---|---|
| 1,013,925 | Bliss | Jan. 9, 1912 |
| 1,088,241 | Royce | Feb. 24, 1914 |
| 1,194,336 | Keim | Aug. 8, 1916 |
| 1,445,716 | Robinson et al. | Feb. 20, 1923 |
| 1,498,072 | Breeze | June 17, 1924 |

FOREIGN PATENTS

| | | |
|---|---|---|
| 195,300 | Great Britain | Mar. 29, 1923 |
| 503,284 | Great Britain | Apr. 4, 1939 |
| 172,514 | Germany | Sept. 25, 1952 |